Patented Aug. 30, 1949

2,480,654

UNITED STATES PATENT OFFICE 2,480,654

RECOVERY OF ARGININE, HISTIDINE, AND LYSINE FROM PROTEIN HYDROLYSATES

Eugene E. Howe, Bound Brook, and Max Tishler, Westfield, N. J., assignors to Merck & Co., Inc., Rahway, N. J., a corporation of New Jersey No Drawing. Application July 29, 1947, Serial No. 764,569

1 Claim. (Cl. 260—309)

This invention relates to the preparation of amino acids and amino acid mixtures; and more particularly to an improved process for preparing from protein acid hydrolysates purified basic amino acid fractions for use in balanced therapeutic mixtures of essential amino acids.

In our pending application Ser. No. 637,498, filed Dec. 27, 1945, now Patent No. 2,457,820, there is disclosed a novel process for preparing balanced amino acid mixtures which are characterized as being free of dicarboxylic acids and substantially free of physiologically inactive isomeric amino acids. Briefly, the process there disclosed comprises extracting an aqueous protein acid hydrolyzate with a 3 to 5 carbon alcohol, recovering from the alcohol extract an amino acid fraction consisting of substantially pure natural essential monoamino monocarboxylic acids, combining said fraction with substantially pure natural essential basic amino acids, crystalline essential amino acids including tryptophane and essential amino acids present but deficient in said fraction, and glycine to form the desired amino acid mixture. The method there disclosed for obtaining the required basic amino acids from a protein hydrolyzate involves treating the alcohol-extracted hydrolyzate, after removal of the excess alcohol, with an adsorbent material which preferentially adsorbs basic amino acids, washing the adsorbent free of dicarboxylic acids, and eluting the basic amino acids with mineral acid.

While the amino acid mixtures produced by the process of said prior application are superior to all previously available amino acid mixtures, it has been found that the recovering of basic amino acids from the hydrolyzate by adsorption and acid elution occasionally leaves objectionable contaminants in the basic fraction. The presence of histamine-like impurities which has sometimes been observed is particularly objectionable because of the tendency of these impurities to lower the blood pressure.

It is now discovered, in accordance with the present invention, that a basic amino acid fraction of increased and uniform purity, free of histamine-like substances, can be prepared by extracting a protein acid hydrolyzate with a 3 to 5 carbon alcohol, concentrating the residual hydrolyzate to remove dissolved alcohol, adsorbing amino acids from the resulting concentrate on an ion exchange resin on the ammonium cycle and eluting the adsorbed basic amino acids with a basic solution. Various aqueous alkaline solutions can be employed, but it is preferred to use about 20% ammonium hydroxide solution since excess ammonia is readily removed by concentrating the eluate to about one-half volume. Resins which can be used in this process include sulphonic acid resins, such as Zeo-Karb, Amberlite IR 100, Dowex 30, and the like.

When this concentrate is used to furnish the basic amino acids in a balanced amino acid solution, the resulting balanced solution is very well tolerated and causes none of the objectionable effects of histamine-like substances which are normally associated with the basic essential amino acids in a protein hydrolyzate.

It is to be understood that the process of the present invention is applicable generally to the production of balanced amino acid solutions for treating various physiological conditions. Certain amino acid mixtures of particular composition have proved to be superior on the basis of their broad therapeutic applicability and economy of production. It will be apparent, however, that different physiological conditions require amino acid solutions of different composition; and the essence of the invention resides not merely in providing solutions having a particular essential amino acid content, but rather in providing amino acid solutions which are free of certain toxic and objectionable components.

The following examples show preferred ways for carrying out the present invention, but it is to be understood that these examples are given by way of illustration and not of limitation.

Example I

One kgm. of casein (ash-free moisture-free basis) is placed in a 5 l. flask with 3300 cc. of 25% hydrochloric acid and boiled under reflux for 20 hrs. The mixture is then concentrated to a syrup under reduced pressure. After the volume has been reduced to about one-third of the original volume, the temperature should be kept below 70° C. during further concentration.

The residual syrup is dissolved in about 5 liters of condensed water and filtered through a thin bed of charcoal to remove insoluble humin.

The filtrate (pH 0.5 to 1.0) is then passed through a kilogram of Amberlite IR-4B (an ion exchange polyamine resin prepared according to Example 4 of U. S. Patent No. 2,402,384 issued June 18, 1946, to J. W. Eastes), arranged in a column about 3 ft. long. The Amberlite is prepared for use by treating with 5% hydrochloric acid, then treating with 10% sodium hydroxide, and washing to pH 7–8.

The filtrate is passed through the column at a rate of about 200 cc./min. and the column is washed with 2–3 l. of water at the same rate. The effluent and washings are collected until the pH reaches 5, and are then agitated for 10–15 min. with about 100 gm. of charcoal. The charcoal is then filtered off and the filtrate is concentrated to about 5 l. At this point, the nitrogen content is about 2.8 gm./100 cc. which represents a loss of only about 3% of that in the original casein. The solution is chilled to 0–5° C. for about 8 hours causing precipitation of tyrosine which is removed by filtration.

The hydrolyzate is then placed in a semi-continuous liquid extractor and extracted with about 20 volumes of butanol at such a pressure (approximately 60 mm. Hg) that the temperature does not exceed about 65° C. The time for extraction is about 36 hours. The butanol containing the precipitated M. A. fraction, i. e., mono-amino mono-carboxylic acids, is chilled to 0–5° C. for about 8 hours, then filtered, and the precipitate is washed with two 250 cc. portions of dry butanol and then with two 250 cc. portions of ether. The precipitate is then dried to constant weight in air at 55° C. The yield of dry M. A. fraction thus obtained is approximately 250 gm., from the kilogram of casein initially treated. (This product contains essential mono-amino mono-carboxylic acids in approximately the following amounts: isoleucine—15%; leucine—31%; methionine—8%; phenylalanine—11%; threonine—3.5%; and valine—13%.

The butanol-extracted hydrolyzate is concentrated to about 4 liters for removal of dissolved butanol and passed through a 6 ft. column containing 2000 gm. of Zeokarb NH4 or Amberlite IR–100 (moisture-free basis) at the rate of about 300 cc. per min. The column is prepared as follows: Fill an 8 ft. length of 60 mm. glass tubing half full of water and introduce 2000 gm. of Zeokarb H (10% moisture) or 2000 gm. of Amberlite IR–100. (Zeokarb H is a sulfonated coal, and Amberlite IR–100 is a modified phenol formaldehyde methylol sulfonic acid type resin.) The column is washed with condensed water until the wash is relatively free of color. Six liters of 20% aqueous ammonia is then passed through the column at 300 cc. per min., and the column is then washed with about 20 liters of condensed water. The column is now ready for treatment of the basic amino acid fraction, although final "conditioning" of the column is effected by the initial run of basic amino acids. Thus the first batch of basic fraction treated in a column should be tested separately for tolerance and toxicity.

The butanol-extracted hydrolyzate is now passed through the column, the basic amino acids being adsorbed on the resin. It is found that approximately 2000 gr. of resin to 1 kilo of original casein will completely adsorb without breakthrough the basic amino acids present in the extracted hydrolyzate.

The column is then eluted with 6 liters of 20% ammonia. The collected eluate is concentrated to about 1.75 liters and an analysis is found to contain about 25 gm. of arginine, 25 gm. of histidine and 70 gm. of lysine. This is approximately 90% of the basic amino acids present in the hydrolyzate from one kilo of casein.

The M. A. fraction and the basic fraction thus prepared are ready for use in preparing solutions containing balanced mixtures of essential amino acids. The following examples show how such mixtures can be prepared.

*Example II*

An aliquot of a solution of basic amino acids prepared as in Example I containing 17.0 gm. of arginine is diluted with water to about 3.5 liters. Nitrogen is passed through the solution for five minutes to expel oxygen. To the oxygen-free solution is added 250 gm. of M. A. fraction, prepared as in Example I and 12 gm. of glycine. The added components are dissolved by heating to about 70° C. if necessary. The pH of the solution is then adjusted to 6.5–7.0 by addition of approximately 19 cc. of concentrated hydrochloric acid. The solution is stirred for about 10 min. with about 35 gm. of charcoal, filtered through a sintered glass funnel, 6.1 gm. of dl-tryptophane is dissolved in the filtrate, and it is diluted to a volume of 4250 cc., to form a solution containing approximately 8% of natural essential amino acids.

The solution is then subdivided into distribution containers, i. e., 450 cc. per 500 cc. bottle and treated for pyrogen removal and sterilization, preferably by expelling oxygen, sealing the bottom, and heating for 3 hours in an autoclave at 120° C. as disclosed in the copending joint application of one of us, Howe and Holly, Serial No. 764,004 filed July 26, 1947.

The approximate proportions of the solute components in this solution are as follows:

| | Per cent |
|---|---|
| M. A. fraction | 73.7 |
| Basic fraction | 18.5 |
| Glycine | 3.5 |
| dl-Tryptophane | 1.8 |
| Hydrochloric acid | 2.5 |
| Total solute | 100.0 |

The approximate content of natural essential amino acids and glycine in this solution, expressed in percent of total solute components, is as follows:

| | Per cent |
|---|---|
| Arginine | 5.0 |
| Histidine | 3.0 |
| Isoleucine | 10.7 |
| Leucine | 20.1 |
| Lysine | 9.0 |
| Methionine | 5.2 |
| Phenylalanine | 9.6 |
| Threonine | 1.8 |
| Tryptophane | 0.9 |
| Valine | 9.0 |
| Total natural essential amino acids | 74.3 |
| Glycine | 3.5 |

*Example III*

The procedure in Example II is repeated using an aliquot of the basic fraction (prepared as described in Example I) containing 25 gm. of arginine, adjusting the volume to about 4.0 liters, expelling oxygen from the solution, and dissolving therein 250 gm. of M. A. fraction (prepared as described in Example I), 118 gm. of glycine, 9.0 gm. of dl-tryptophane and 23 gm. of dl-methionine. The pH is adjusted to 6.5–7.0 by the addition of about 28 cc. of concentrated hydrochloric acid, and after treatment with about 50 gm. of charcoal and filtration, the solution is diluted to 5 liters. This solution, which contains approximately 10% of natural essential amino acids, is subdivided and treated for pyrogen removal and sterilization as described in Example II.

The approximate proportions of the solute components in this solution are as follows:

|  | Per cent |
|---|---|
| M. A. fraction | 50.0 |
| Basic fraction | 18.5 |
| Glycine | 22.6 |
| dl-Tryptophane | 1.8 |
| dl-Methionine | 4.6 |
| Hydrochloric acid | 2.5 |
| Total solute | 100.0 |

The approximate content of natural essential amino acids and glycine in this solution, expressed in percent of total solute components, is as follows:

|  | Per cent |
|---|---|
| Arginine | 5.0 |
| Histidine | 3.0 |
| Isoleucine | 7.4 |
| Leucine | 17.2 |
| Lycine | 9.0 |
| Methionine | 8.5 |
| Phenylalanine | 6.0 |
| Threonine | 1.5 |
| Tryptophane | 0.9 |
| Valine | 5.3 |
| Total natural essential amino acids | 63.8 |
| Glycine | 22.6 |

The amino acid mixtures described in Examples II and III are superior mixtures from the viewpoint of utilization and economy. The mixture in Example III has the added advantage of greater solubility permitting the use of 10% or even 12% solutions. A 12% solution is prepared by merely diluting to approximately 4.17 liters instead of 5 liters in the final volume adjustment. The significance of this higher solubility is apparent when it is realized that amino acid solutions for parenteral injection must be free of undissolved or precipitated material.

It is evident from the foregoing examples that histamine-free basic fraction is produced by our improved process in amounts considerably greater than are combined with M. A. fraction from the starting casein. The excess of basic fraction provides an excellent source for recovery of pure natural essential basic amino acids in accordance with the process disclosed in our companion application Serial No. 764,570 filed July 29, 1947.

Various changes and modifications in the foregoing procedures can be made without departing from the spirit and scope of the present invention, and we are to be limited only by the appended claim.

We claim:

A process for recovering the basic amino acids, arginine, histidine, and lysine from the residual aqueous solution obtained after extracting an aqueous protein acid hydrolyzate with a 3 to 5 carbon alcohol, that comprises passing the aqueous solution through an ion exchange resin on the ammonium cycle to adsorb the basic amino acids, eluting simultaneously the three basic amino acids with about 20% ammonium hydroxide solution, and concentrating the eluate to about one-half volume to form an aqueous solution of said basic amino acids essentially free of ammonia and impurities having a histamine-like effect on blood pressure.

EUGENE E. HOWE.
MAX TISHLER.

REFERENCES CITED

The following references are of record in the file of this patent:

UNITED STATES PATENTS

| Number | Name | Date |
|---|---|---|
| 2,387,824 | Block | Oct. 16, 1945 |
| 2,462,597 | Block | Feb. 22, 1949 |

OTHER REFERENCES

Schmidt, Chemistry of the Amino Acids and Proteins (1938), pp. 142–146.

Freudenberg et al., Naturwissensehaften, vol. 30, page 87 (1942).

Block and Bolling, American Journal of Pharmacy, Oct. 1944, pp. 368–369.

Block, Archives of Biochemistry, vol. 11 (Oct. 1946).